United States Patent
Marsala et al.

(10) Patent No.: US 6,405,767 B1
(45) Date of Patent: Jun. 18, 2002

(54) FUEL FILL PIPE ASSEMBLY WITH VORTEXING VANES

(75) Inventors: Vincent Joseph Marsala, Auburn Hills; Akram R. Zahdeh, Davisburg, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/678,374

(22) Filed: Oct. 3, 2000

(51) Int. Cl.$^7$ .................................................. B65B 1/04
(52) U.S. Cl. ...................................... 141/286; 220/86.2
(58) Field of Search ................................ 141/286, 392; 220/86.2

(56) References Cited

U.S. PATENT DOCUMENTS

| | | | |
|---|---|---|---|
| 4,274,549 A | * 6/1981 | Germain | 220/86.2 |
| 4,881,578 A | 11/1989 | Rich et al. | 141/44 |
| 5,282,497 A | 2/1994 | Allison | 141/59 |
| 5,363,705 A | 11/1994 | Nakao et al. | 73/861.23 |
| 5,673,738 A | 10/1997 | Spaulding | 141/392 |
| 5,752,553 A | * 5/1998 | Kmiecik et al. | 141/286 |
| 5,860,460 A | * 1/1999 | Hidano et al. | 141/286 |
| 5,960,833 A | 10/1999 | Der Manuclian | 138/112 |
| 6,000,426 A | 12/1999 | Tuckey et al. | 137/588 |
| 6,026,853 A | 2/2000 | Osterbrink | 137/527.4 |
| 6,065,507 A | 5/2000 | Nanaji | 141/59 |

* cited by examiner

Primary Examiner—Steven O. Douglas
(74) Attorney, Agent, or Firm—Laura C. Hargitt

(57) ABSTRACT

A fuel fill pipe assembly for promoting less turbulent flow in a fuel pipe is disclosed. The assembly includes a pipe extending between a first end and a second end and at least one vane positioned on the pipe for urging the formation of at least a partial vortex within fuel that traverses through the pipe.

4 Claims, 3 Drawing Sheets

FUEL FILL PIPE ASSEMBLY WITH VORTEXING VANES

FIELD OF THE INVENTION

The present invention relates to a fuel fill pipe assembly, which includes a pipe that extends from a fuel tank or other fuel reservoir to a fill pipe access area or location. More particularly, the present invention relates to a fuel fill pipe assembly, which includes a fuel fill pipe for an automotive vehicle wherein the pipe includes vanes, which are disposed at particular positions upon the pipe for forming a vortex in fuel that is dispensed to the pipe.

BACKGROUND OF THE INVENTION

A great many tanks or other reservoirs which contain and/or store fuel include a fuel fill pipe which extends outwardly from the tank or reservoir to a location where fuel may be dispensed in the fill pipe and flow to the tank or reservoir. For example, and without limitation, automotive vehicles typically include a fuel fill pipe which extends from a gasoline tank of the vehicle to another portion or location of the vehicle where fuel (e.g., gasoline) may be dispensed or pumped into the fill pipe and flow to the gasoline tank. It is generally desirable for fuel to be dispensed in these fill pipes such that the fuel flow into the pipe is laminar or smooth and causes very little or minimal turbulence because turbulent flow can cause vapor from the fuel to be released into the environment and turbulence can undesirably slow the fuel flow into or through the pipe thereby undesirably increasing the time required to dispense the fuel. Furthermore, slow or turbulent fuel flow can cause additional problems for automotive vehicles. For example, and without limitation, fuel may be dispensed to automotive vehicle fill pipes or other fill pipes with a nozzle having an automatic "shut off" feature that is triggered when the gasoline tank of the vehicle or other reservoir is full and fuel begins to gather in the fill pipe. If the fuel that flows into the fill pipe is turbulent, the fuel being dispensed may flow too slowly and may gather in the pipe prematurely and trigger the automatic shut off feature before the tank or reservoir is full or may cause fuel that has gathered in the pipe to be undesirably emitted from the fuel pipe near the nozzle that is dispensing the fuel.

Therefore, it is desirable to provide a fuel fill pipe, which assists in minimizing the turbulence experienced when fuel is dispensed in the pipe.

SUMMARY OF THE INVENTION

According to a first aspect of the present invention, there is disclosed a fuel fill pipe assembly. The assembly includes a pipe extending from a reservoir suitable for supporting fuel, the pipe being suitable for receiving the fuel; and a vane positioned on the pipe for urging the formation of at least a partial vortex within the fuel as the fuel traverses through the pipe.

According to a second aspect of the invention, there is disclosed a fuel fill pipe assembly for an automotive vehicle. The assembly includes a pipe extending along a length of the pipe between a proximate end and a distal end, the proximate end suitably attached to a fuel tank of the vehicle, the distal end suitable for receiving a nozzle for dispensing fuel, and a first, second and third vane position on the pipe for urging the formation of at least a partial vortex within the fuel as the fuel traverses through the pipe, the first, second, and third vane being elongated and extending along at least a portion of the length of the pipe.

These and other objects, aspects, and advantages of the present invention will become apparent upon reading the following detailed description in combination with the accompanying drawings.

FIG. (2a) illustrates a perspective view of a portion of the fuel fill pipe assembly according to an aspect of the present invention.

Figure 2A:
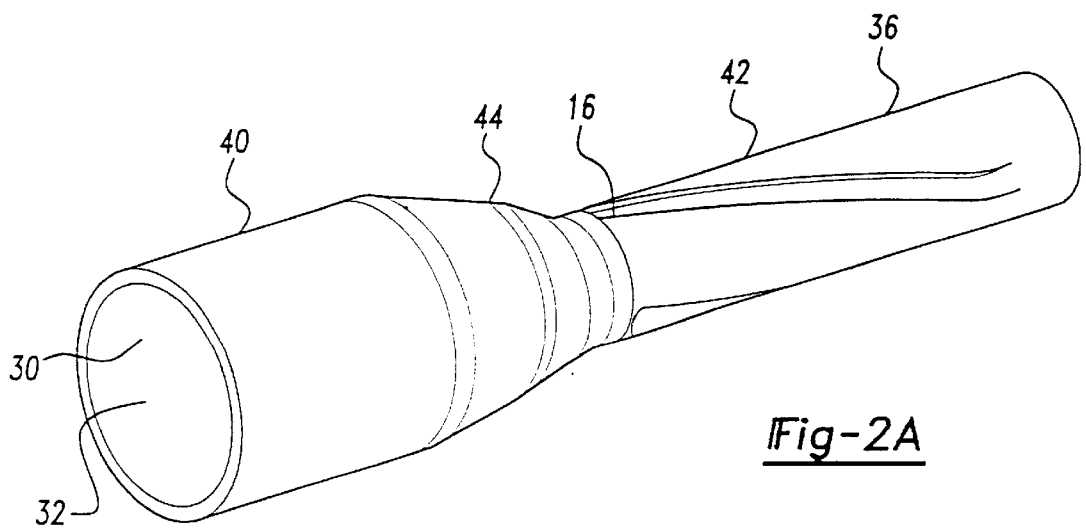
Figure 2B:
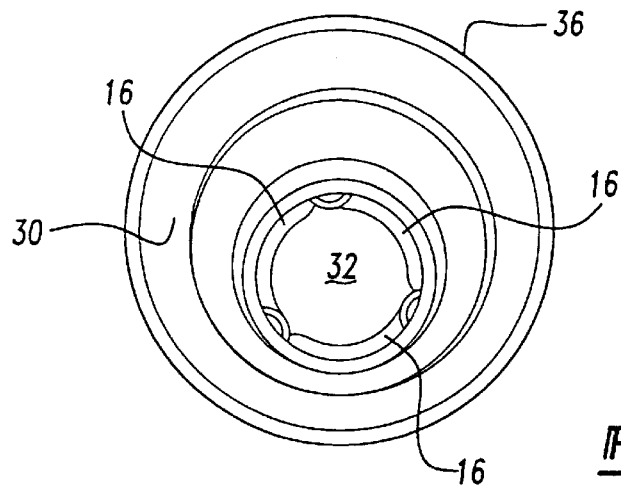

FIG. (2b) illustrates a rear view of the portion of the fuel fill pipe assembly shown in FIG. 2(a).

Figure 2C:
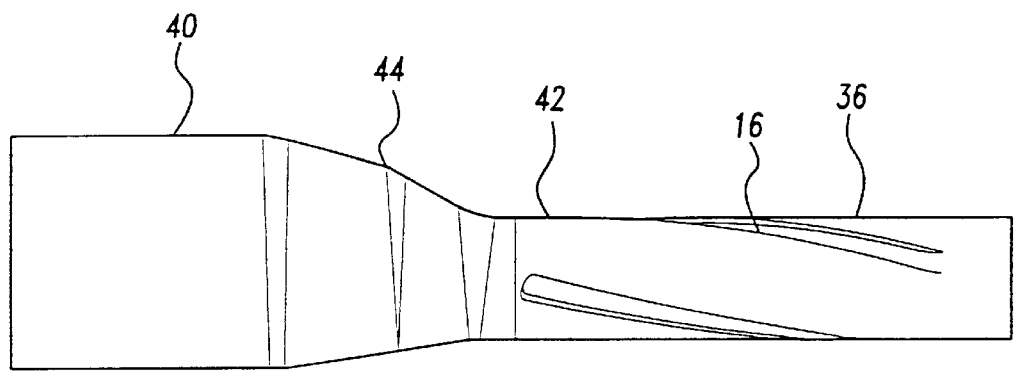

FIG. 2(c) illustrates a side view of the portion of the fuel fill pipe assembly shown in FIGS. 2(a) and 2(c).

Figure 3A:
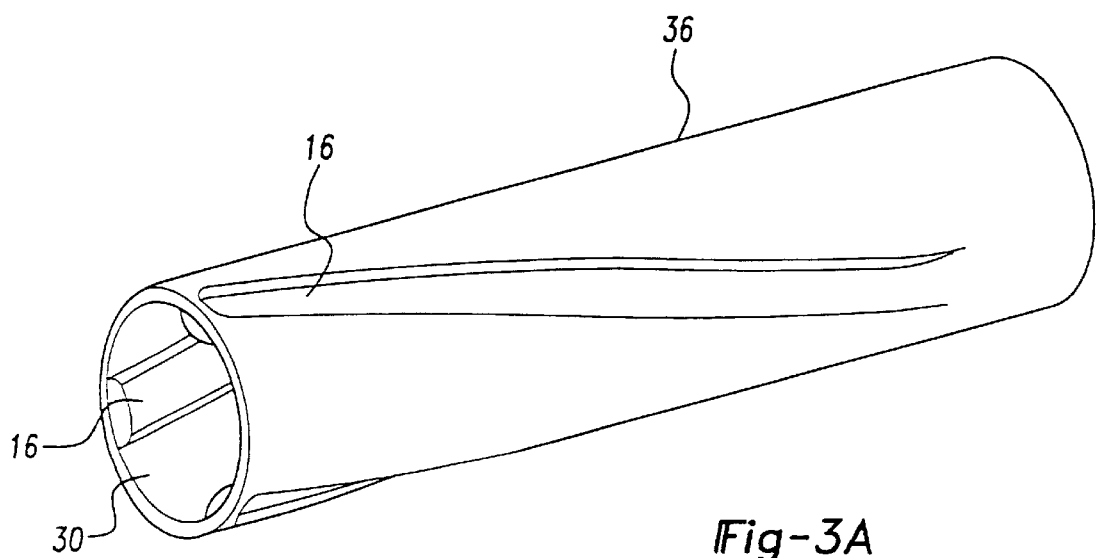

FIG. 3(a) illustrates a perspective view of a portion of the fuel fill pipe assembly according to an aspect of the present invention.

Figure 3B:
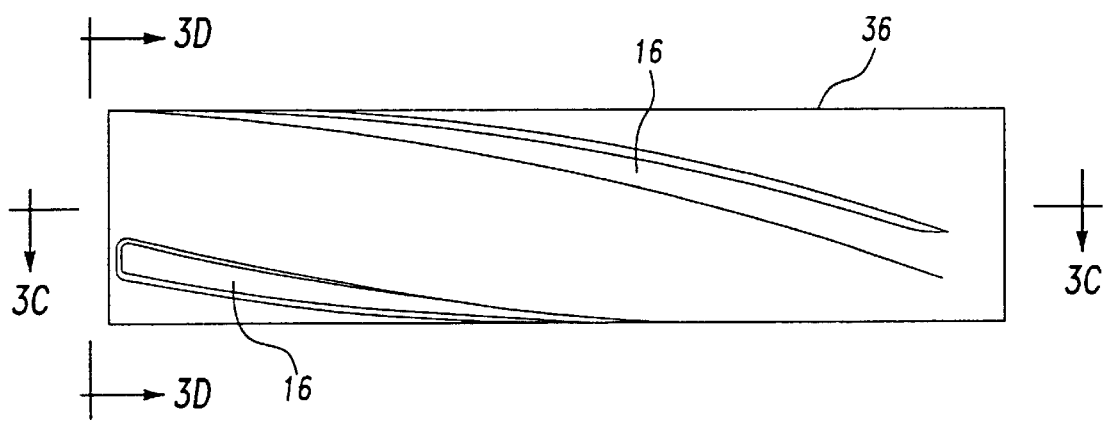

FIG. 3(b) illustrates a side view of the portion of the fuel fill pipe assembly shown in FIG. 3(a).

Figure 3C:
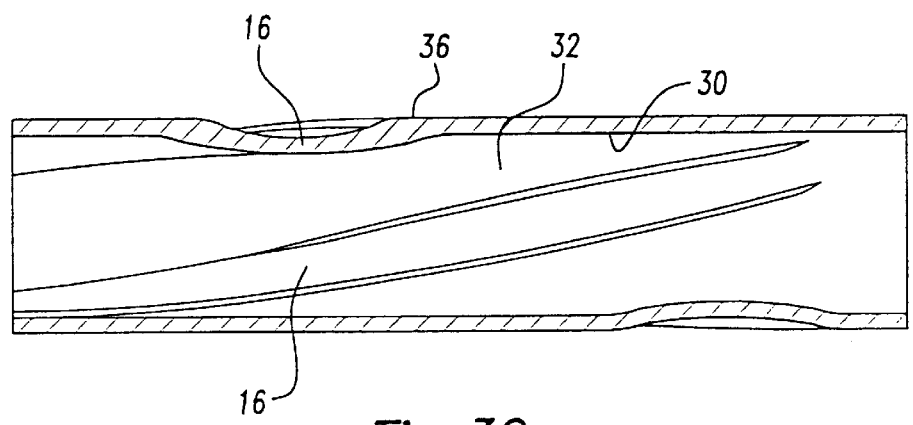

FIG. 3(c) illustrates a sectional view of the portion of the fuel fill pipe assembly as shown in FIGS. 3(a) and 3(b) taken along line 3C–3C.

Figure 3D:
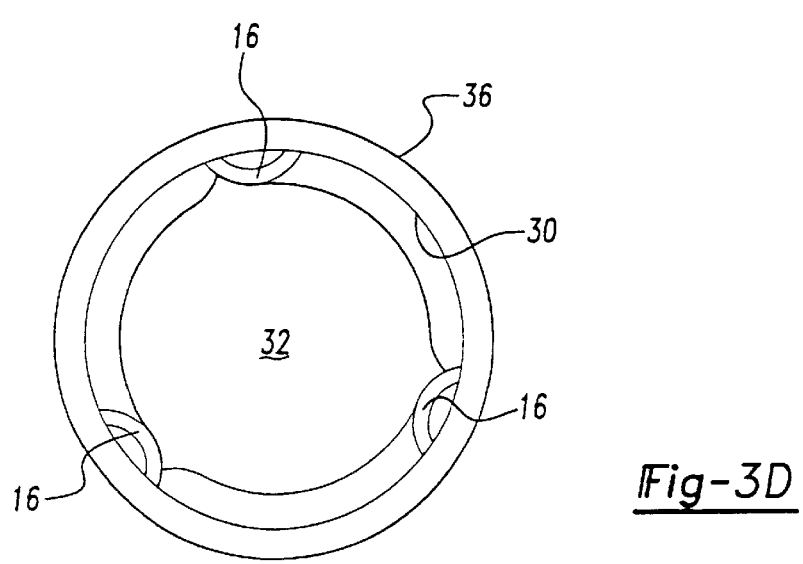

FIG. 3(d) illustrates a rear view of the portion of the fuel fill pipe assembly as shown is FIGS. 3(a), 3(b) and 3(c) taken from the vantage of line 3D–3D.

DETAILED DESCRIPTION OF PREFERRED EMBODIMENTS

Figure 1:
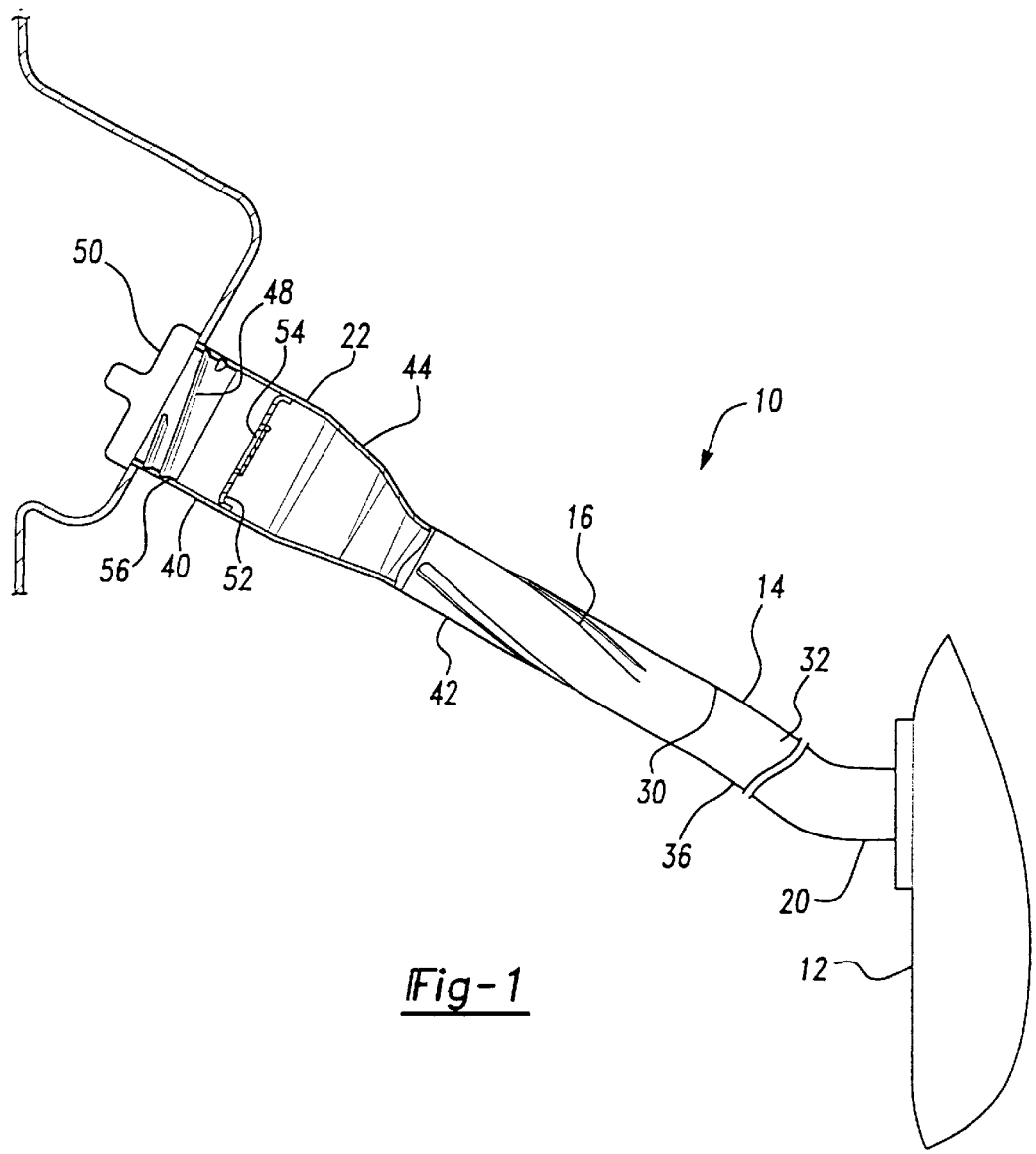
FIG. 1 illustrates a sectional side view of a fuel fill pipe assembly according to an aspect of the present invention.

Referring now to FIG. 1, there is illustrated a fuel fill pipe assembly 10 which is used to receive fuel that flows from a fuel dispensing or receiving area to a reservoir or tank for storing, supporting or containing the fuel. One of skill in the art will appreciate that the fuel fill pipe assembly 10 can be used to receive fuel for a gasoline tank 12 of an automotive vehicle. However, one of skill in the art will also appreciate that the fuel fill pipe assembly 10 or variations of the fuel fill pipe assembly 10 can be used in a variety of applications other than automotive vehicles. For instance, the fuel fill pipe assembly 10 or slight variations of the fuel fill pipe assembly 10 may also be used for reservoirs such as boat fuel tanks or other fuel tanks or reservoirs which have fill pipes. For illustrative purposes, however, the non-limiting embodiment of the fuel fill pipe assembly 10 that is shown in FIG. 1 is for use in an automotive vehicle wherein the assembly 10 includes a conventional fuel tank or reservoir 12 a fuel fill pipe 14 and vanes 16 which are attached or integrated into the pipe 14.

Referring now to FIG. 1, the fuel fill pipe 14 is elongated with a length that extends between a proximate end 20 located near the fuel tank 12 and a distal end 22 near a fill pipe access area. In the embodiment shown, the pipe 14 includes a cylindrical inner surface 30, which defines an annular hole, opening or passageway 32 that extends along the elongation or length of the pipe 14. The pipe 14 also includes an outer surface 36 that extends along the elongation or length of the pipe 14.

In a non-limiting embodiment of the invention, the distal end 22 of the pipe 14 includes a first generally cylindrical portion 40 having a first diameter, a second generally cylindrical portion 42 having a second diameter and a generally frusto-conical portion 44 disposed between the first and second cylindrical portions 40, 42. In the embodiment shown, the first diameter of the first cylindrical portion 40 is greater than the second diameter of the second cylindrical portion 42.

It shall be recognized that, in alternative embodiments of the invention, the fill pipe may be formed in a variety of configurations of varying size and/or shape. For example, the pipe may be generally square, elliptical, triangular, polygonal or other combination of shapes and/or curves along the length or elongation of the pipe. Furthermore, the pipe may vary in size along its length or may vary in length.

In a non-limiting embodiment, the first cylindrical portion 40 of the distal end 22 is designed to engagingly contact or otherwise attach to a conventional closure device 50 (i.e., a gas cap) such that the cap 50 may be selectively secured to or adjacent the first cylindrical portion 40 of the distal end 22. In a non-limiting embodiment shown, the first cylindrical portion 40 may be formed with a conventional screw thread or spiraling ridge (not shown) and the conventional cap or closure device 50 may include a mating screw thread or spiraling ridge 48 such that the closure device may be screwed to or mated with the cylindrical portion 40 of the distal end 22.

The person of skill in the art will recognize that a variety of closure devices may be used in conjunction with the fill pipe assembly or for certain pipes, a closure device may be unneeded. Furthermore, the first cylindrical portion 40 and the cap 50 may be altered in size and shape and the manner in which the cap 50 is attached to the pipe, may be altered without departing from the scope of the present invention.

In a further non-limiting embodiment of the invention, the distal end 22 of the pipe 14 includes a guide member 52, which extends away from the first cylindrical portion 40 and at least partially into the portion of the passageway 32 in the larger cylindrical portion 40. In the embodiment shown, the guide member 52 is annularly shaped, is disposed substantially perpendicular to the cylindrical portion 40, and includes a fuel access opening 54 in the center of the guide member 52. The opening 54 provides access to the fuel pipe 14 such that an individual or machine may dispense fuel into the pipe 14 and, therefore, into the reservoir or tank 12 by directing fuel through the opening 54. In the embodiment shown, the opening 54 is sized to receive a conventional fuel nozzle for automotive vehicles such that an individual may place a conventional dispensing portion of the fuel nozzle into the opening 54 and dispense (i.e., pump) gasoline into the fuel pipe 14 and the receptacle 12.

The person of skill in the art will recognize that the guide member and other components of the distal end of the fuel fill pipe may be formed in a variety of configurations without departing from the scope of the present invention.

Referring to FIGS. 1–3(d) the fuel fill pipe assembly 10 also includes vanes 16 which are positioned on the fill pipe 14. In the non-limiting embodiment shown, the vanes 16 are convex with respect to the passageway 32 of the pipe and extend inwardly into the passageway 32 of the pipe 14 while a portion of the vanes are defined by the outer surface 36 of the pipe 14 and are generally concave with respect to the area outside of the pipe 14. However, it is possible for the vanes to be concave or open and extend away from the passageway 32. Furthermore, the vanes 16 are generally arcuate and reside in the smaller diameter portion 42 of the fill pipe 14. In the embodiment shown, the vanes 16 are generally elongated and spiraling along a portion of the elongation of the fill pipe 14. Also in the embodiment shown, the vanes 16 extend approximately six to eight inches along the length of the smaller diameter cylindrical portion 42 of the pipe 14. However, in alternative embodiments of the invention, the vanes 16 may only extend along a smaller portion of the length of the pipe or the vanes may extend along larger portions of the length of the pipe and even along the entire length of the pipe 14.

In a non-limiting embodiment, the vanes 16 extend further into the open portion 32 of the pipe 14 at or near the frusto-conical portion 44 or distal end 22 than toward the proximate end 20. In the particular embodiment shown, the vanes 16 gradually decrease in the distance that they extend into the pipe 14 as the vanes extend away from the distal end 22 or near the frusto-conical portion 44 and toward the proximate end 20 until the vanes 16 end or do not extend into the open portion of the pipe.

The fuel pipe 14 may include one or a plurality of vanes 16 spaced equidistantly or otherwise on the pipe 14. In the embodiment shown, there are three vanes 16 disposed substantially equidistantly around the inner and/or outer surfaces of the fill pipe.

In alternative embodiments, the vanes may be relatively small or relatively large and they may extend very slightly into the internal open portion of the pipe or they may extend across the entire distance of the internal portion of the pipe or somewhere in between.

In further alternative embodiments the vanes 16 may extend into the frusto-conical portion 44 or the larger cylindrical portion 40 of pipe. In even further alternative embodiments of the invention, the distal end 22 or the proximate end 20 of the pipe may have an alternative configuration and the vanes may be positioned or placed upon areas of the alternative configurations. The vanes 16 may be continuous or non-continuous, elongated or non-elongated and may be positioned at variable locations along the length of the pipe 14.

In the embodiment shown, the pipe 14 and the vanes 16 are formed from a suitable metal such as steel, aluminum, iron or a combination thereof. In alternative embodiments, the pipe 14 may be formed from other metals, plastics, rubber or other suitable materials. The tank 12 is also formed of a suitable metal such as steel, aluminum, iron, a combination thereof or some other suitable material. The cap 50 may be formed of plastic or other suitable material.

ASSEMBLY OR FORMATION

The fill pipe 14 may be formed or assembled in a variety of manners. In one non-limiting embodiment, the pipe 14 may be formed from a conventional cylindrical metal pipe material having a substantially uniform or non-uniform diameter. In the embodiment, the pipe 14 is formed according to conventional methods such as hydroforming, casting or other suitable forming methods. Furthermore, in the embodiment, one or more mandrels or other forming devices may be used to enlarge, constrict or otherwise shape portions of the pipe 14 to form the large cylindrical portion 40, the frusto-conical portion 40 and the smaller cylindrical portion 42 or other desired portions. In an alternative embodiment, the fill pipe 14 may be cast, hydroformed or otherwise formed to directly form the large cylindrical portion 40, the frusto-conical portion 40 and the small cylindrical portion 42.

The vanes 16 in the fill pipe 14 may be formed in a variety of manners as well. In one embodiment, the pipe 14 is placed upon a fixture and the vanes are rolled into the pipe 14 with a rolling machine. In an alternative embodiment, the vanes 16 may be formed in the pipe by hydroforming the pipe with a die that is suitably shaped to form the vanes 16 in the pipe 14. In still another embodiment, the pipe 14 may be cast or otherwise formed with the vanes 16. In still another embodiment, the vanes 16 may be separate components or strips (e.g., metal strips), which may be attached (e.g. welded or adhesively attached) to the pipe 14.

The person of skill in the art will recognize that a variety of manners or methods of metal or material forming or attachment may be utilized to place or position vanes in, on, upon or adjacent a given pipe. The person of skill in the art shall also recognize that the terminology "vanes positioned on the pipe" includes vanes that are added to or integrally formed on the pipe.

OPERATION

Referring again to FIGS. 1–2(*c*), the manner in which the assembly 10 assists in the flow of fuel to the tank will be discussed.

Generally, fuel that flows into a pipe, especially fuel that initially enters a pipe, may experience turbulent flow. In such cases, the fuel flowing into the pipe may tend to back up or build up, thereby undesirably restricting flow into and through the pipe. However, vanes in the pipe can help urge the fuel into an elliptical, circular or spiraling flow pattern as the fuel flows through the pipe thereby forming at least a partial vortex in the fuel. Such a vortex can assist the fuel in forming a more laminar or less turbulent flow through the pipe thereby assisting in the avoidance of the undesirable back ups or build ups of fuel in portions of a pipe.

Specifically in the case of automotive vehicles, but also with other fill pipes that are designed to receive fuel, nozzles or other dispensing devices dispense, pour or otherwise place the fuel in the pipe. In the non-limiting embodiment shown, the opening 54 of the fill pipe 14 is designed to receive a conventional gasoline nozzle. The nozzle dispenses fuel into or through the larger cylindrical portion 40, the frusto-conical portion 44 or the smaller cylindrical portion 42 of the pipe 14 depending on the length of the nozzle. As the fuel flows past the vanes 16, the vanes 16 tend to guide or rotate the fuel in a generally circular or elliptical spiraling motion as the fuel traverses the smaller cylindrical portion 42 or other portions of the fill pipe 14 toward the tank 12. Therefore, the fuel tends to form at least a partial vortex as it enters and travels through the pipe 14.

Advantageously, the fuel that forms such a vortex tends to flow through the smaller cylindrical portion 42 of the pipe 14 in a less turbulent manner. Therefore, the fuel entering or traversing the smaller cylindrical portion 42 does so quickly and more laminarly and does not tend to back-up in the pipe 14.

It shall be recognized that alternative embodiments of fill pipes with vortexing vanes may be designed to alter the flow of fuel in those pipes.

It should be understood that the invention is not limited to the exact embodiment or construction, which has been illustrated and described but that various changes may be made without departing from the spirit and the scope of the invention.

What is claimed is:

1. A fuel fill pipe assembly comprising:

a pipe for receiving fuel extending from a reservoir suitable for supporting fuel, said pipe is generally cylindrical and has a length; and a vane positioned on and spiraling along said length of said pipe for urging the formation of at least a partial vortex within said fuel as said fuel traverses through said pipe;

wherein said pipe includes a first cylindrical portion having a first diameter, a second cylindrical portion having a second diameter and a frusto-conical portion disposed between said first cylindrical portion and said second cylindrical portion and wherein said vane is located upon said second cylindrical portion, said second diameter being smaller than said first diameter.

2. A fuel fill pipe assembly comprising:

a pipe for receiving fuel extending from a reservoir suitable for supporting fuel, said pipe is generally cylindrical and has a length;

first, second, and third vanes positioned on and spiraling along said length of said pipe for urging the formation of at least a partial vortex within said fuel as said fuel traverses through said pipe.

3. A fuel fill pipe assembly for an automotive vehicle comprising:

a pipe extending along a length of said pipe between a proximate end and a distal end, said proximate end suitably attached to a fuel tank of said vehicle, said distal end suitable for receiving a nozzle for dispensing fuel, a first, second and third vane position on said pipe for urging the formation of at least a partial vortex within said fuel as said fuel traverses through said pipe, said first, second, and third vane being elongated and extending along at least a portion of the length of said pipe.

4. A fuel fill pipe assembly as in claim 3, wherein said vanes extend between said proximate and distal ends of said pipe.

\* \* \* \* \*